March 10, 1970 M. J. G. TIPPER ET AL 3,499,259
PACKAGING APPARATUS AND METHOD
Original Filed Feb. 9, 1966 5 Sheets-Sheet 1

INVENTORS
MAYNARD J. G. TIPPER
JAMES W. MARIETTA, JR.
BY Gordon Hood
ATTORNEY

March 10, 1970  M. J. G. TIPPER ET AL  3,499,259

PACKAGING APPARATUS AND METHOD

Original Filed Feb. 9, 1966  5 Sheets-Sheet 2

INVENTORS
MAYNARD J. G. TIPPER
JAMES W. MARIETTA, JR.

BY

ATTORNEY

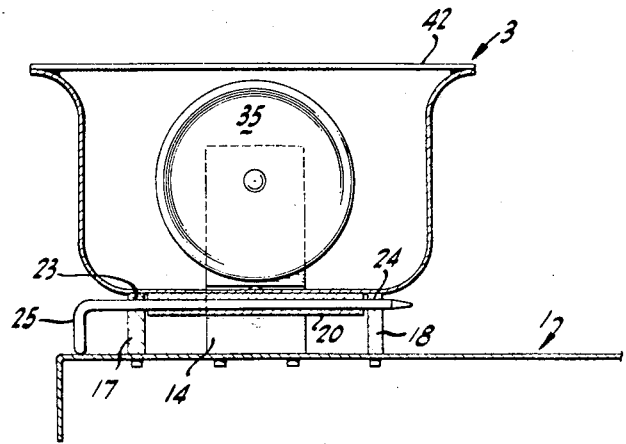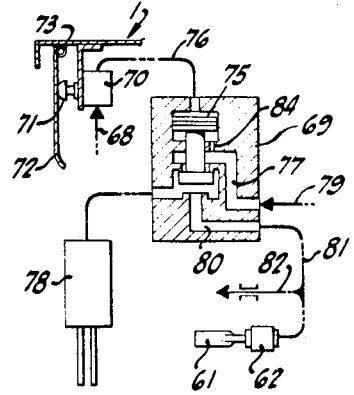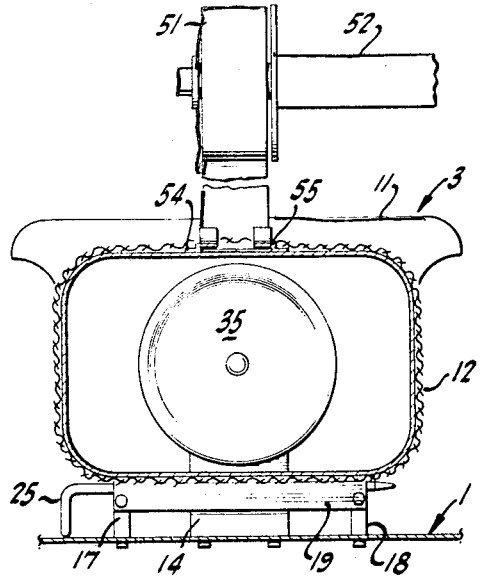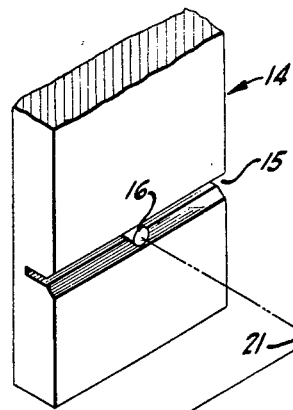

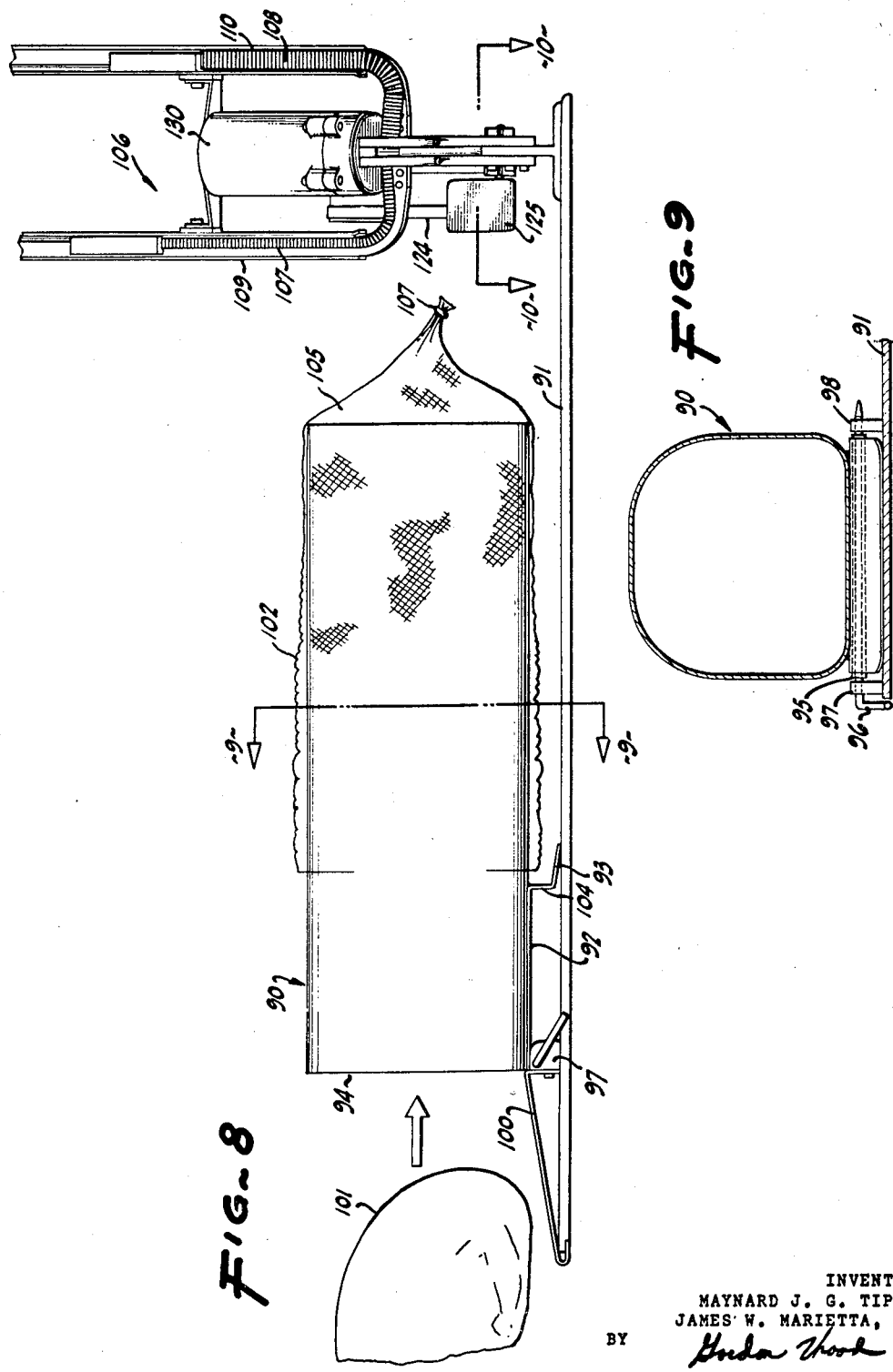

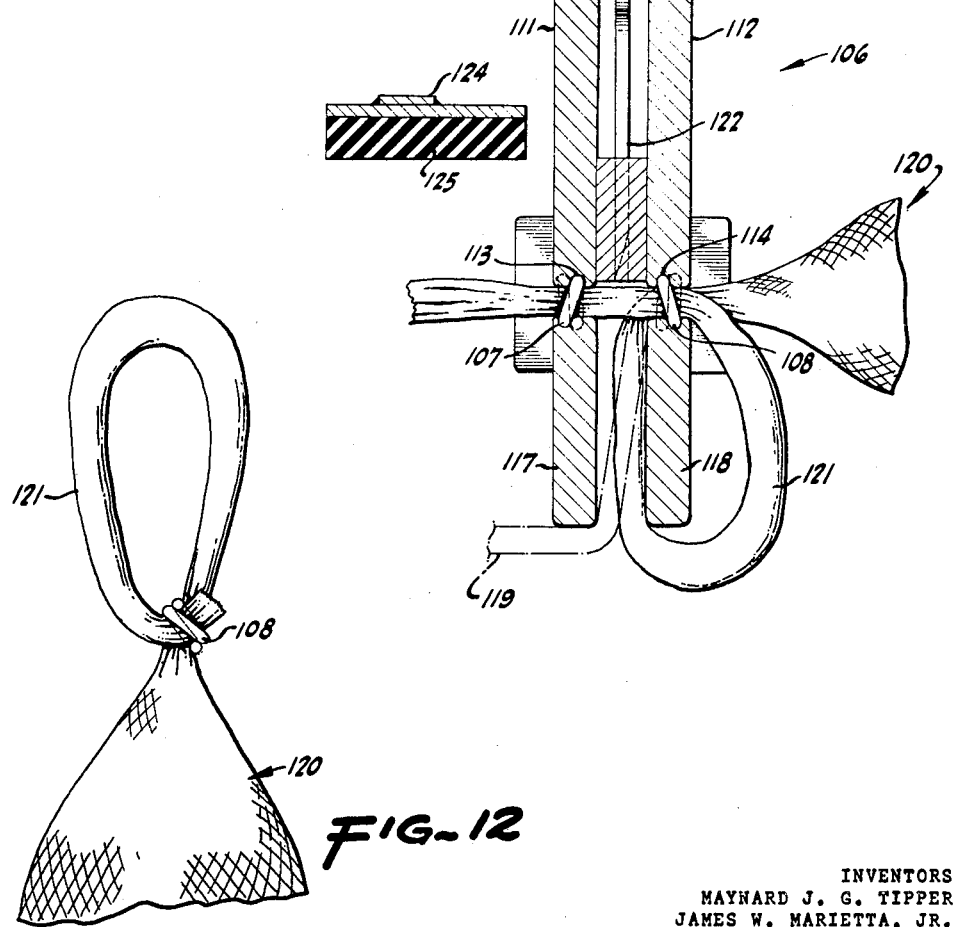

United States Patent Office 3,499,259
Patented Mar. 10, 1970

3,499,259
PACKAGING APPARATUS AND METHOD
Maynard J. G. Tipper, Oakland, and James W. Marietta, Jr., San Leandro, Calif., assignors to Rheem Manufacturing Company, New York, N.Y., a corporation of California
Original application Feb. 9, 1966, Ser. No. 526,301, now Patent No. 3,389,533, dated June 25, 1968. Divided and this application Jan. 22, 1968, Ser. No. 721,905
Int. Cl. B65b 61/14
U.S. Cl. 53—14                2 Claims

ABSTRACT OF THE DISCLOSURE

A method of packaging meat and poultry products or other objects of irregular shape is provided wherein a flexible wrapper is gathered into a rope-like extension at one end of the package, formed into a loop and clipped in place to form a carrying handle. In an alternate embodiment such a handle is formed and one end of a succeeding package is closed simultaneously therewith.

---

This is a division of application Ser. No. 526,301, filed Feb. 9, 1966, now Patent No. 3,389,533.

This invention relates to a method and apparatus for packaging a product or plurality of products and has been found to be particularly useful in packaging meats, produce and other articles which do not have an exact predetermined shape. Although the method and apparatus disclosed herein lend themselves to use with an evacuated package such as may be formed by an imperforate plastic material in which the product is wrapped, the particular forms of the invention disclosed herein are those in which the packaging material is not air tight but rather of an open weave such as stockinet and the plastic material that is known in the trade by the trademark Vexar.

One of the main objects of the present invention is the provision of a method and apparatus which greatly facilitate the wrapping of a product or a plurality of products with an outer covering to protect the products from injury, to simplify handling the same and to enhance the appearance of the product.

Another object of the invention is the provision of a simple apparatus that facilitates the use of an elongated tubular material such as stockinet or Vexar which is flexible in nature and which therefore lends itself to storage on a feeding "horn" or the like in a shirred condition.

Yet another object of the invention is the provision of a method and apparatus for packaging a product within an elongated length of packaging material and at the same time provide a labeling means for applying a label to the package simultaneously with the packaging steps.

Still another object of the invention is the provision of a method and apparatus for incorporating a handle means in a package with the handle being formed from the packaging material itself thus reducing cost and speeding up the packaging operation.

Another object of the invention is the provision of a novel clipping means for applying seals in the form of U-shaped staples to the packages in such a manner as to form an integral handle at one end of each package.

Other objects and advantages will be apparent from the following specification and drawings.

FIG. 4 is a transverse section taken in a plane indicated by lines 4—4 of FIG. 3.

FIG. 5 is a transverse section taken in a plane indicated by lines 5—5 of FIG. 3.

FIG. 6 is a fragmentary exploded view showing the cooperation of the rear end of the removable chute with the rear chute support.

FIG. 7 is a schematic diagram of a portion of the fluid system.

FIG. 8 is a side elevation of a modified form of the invention.

FIG. 9 is a transverse section taken in a plane indicated by lines 9—9 of FIG. 8.

FIG. 10 is an enlarged horizontal section through the clipper and as taken in a plane indicated by lines 10—10 in FIG. 8.

FIG. 11 is a schematic view showing the relationship between the punches of the clipper shown in FIGS. 8, 10 and the clips used therewith.

FIG. 12 is a fragmentary side elevation of the handle end of a package formed by the device of FIGS. 8–11.

Figure 1:
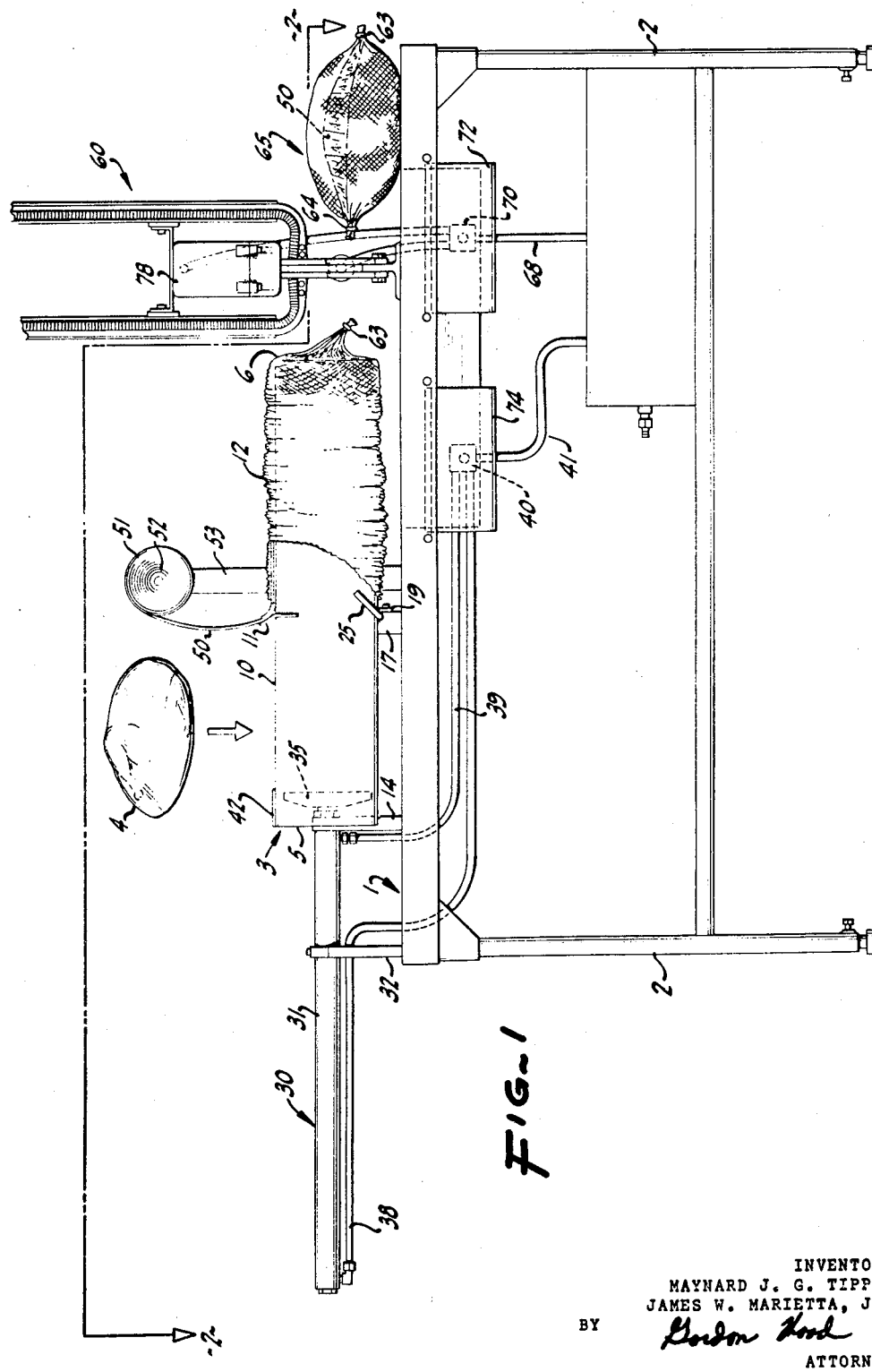
FIG. 1 is a side elevation, partly broken away and in section, of one form of the invention.

One form of the invention is shown in FIGS. 1 through 7 and the apparatus thereof comprises an elongated table top generally designated 1 which is supported at a convenient elevation by means of legs 2. Positioned on the table top 1 is an elongated feeding chute generally designated 3 along which a product such as a turkey indicated at 4 in FIG. 1 is adapted to be translated from a position adjacent the rear end 5 of the chute along the length of the chute and out through the forward end 6 thereof.

Figure 2:
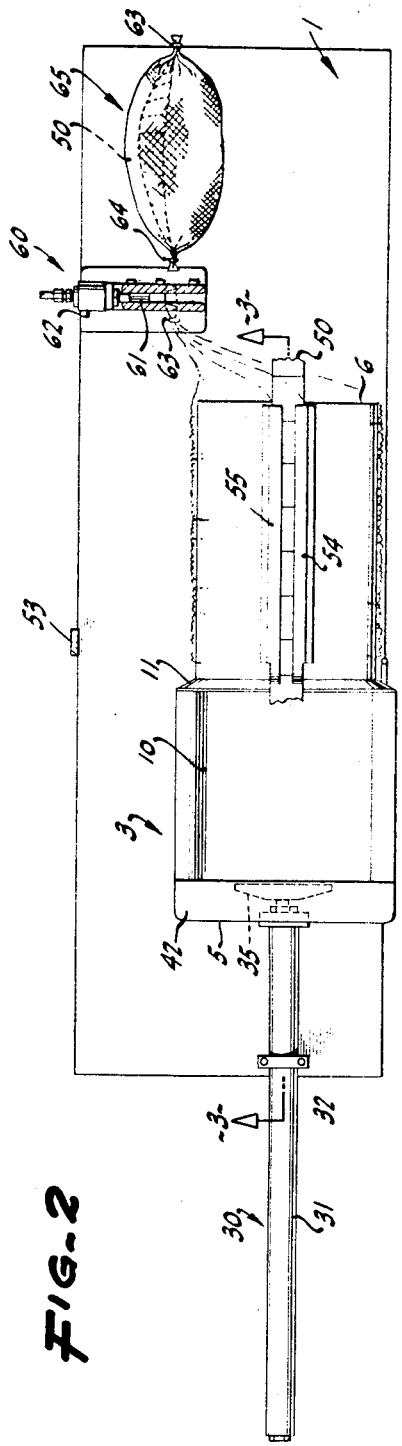
FIG. 2 is a top plan view, partly in section, of the invention as taken in a plane indicated by lines 2—2 of FIG. 1.
Figure 3:
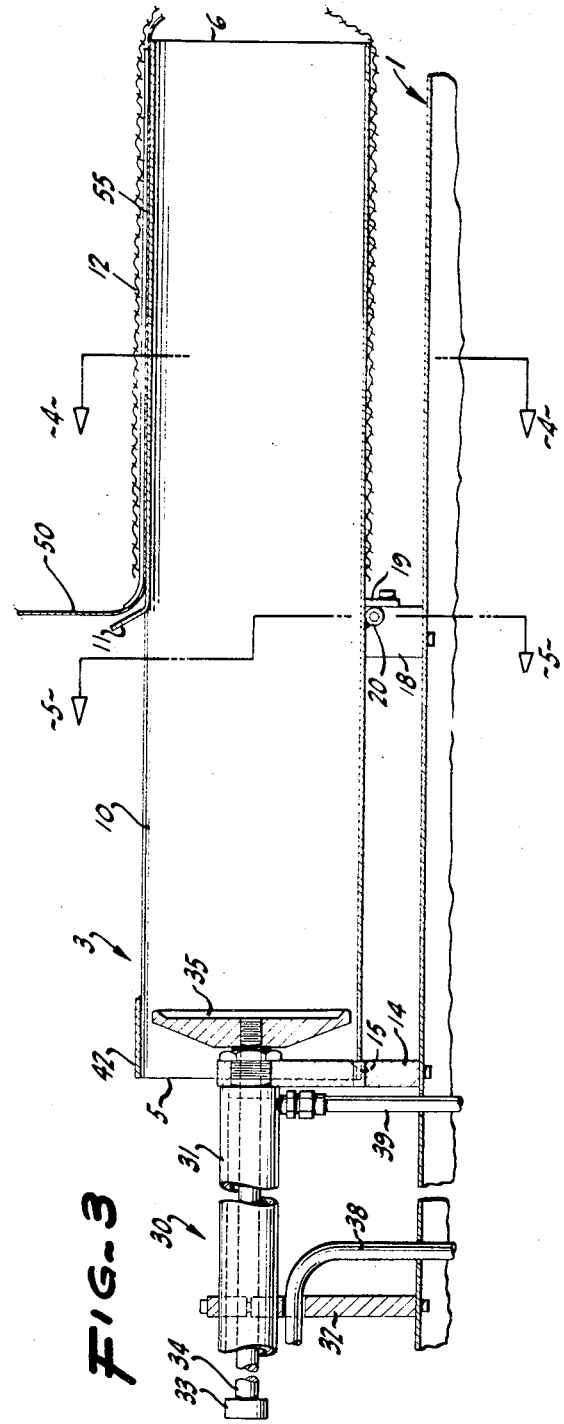
FIG. 3 is a longitudinal sectional view taken in a plane indicated by lines 3—3 of FIG. 2.

The chute of FIGS. 1 to 4 is preferably formed to provide an upwardly directed opening 10 through which the product may be fed into the chute 3. Intermediate the opposite ends 5, 6 of the chute 3 the same is provided with an upwardly and rearwardly directed flange 11 defining the forward end of opening 10 and which serves as a stop against which flexible tubular packaging material 12 may be stored in shirred condition as seen in FIGS. 1 to 3. It will be understood that a relatively long length of shirred material such as stockinet or Vexar may be applied to the end of chute 3 forwardly of flange 11 with only a portion of the packaging material being pulled at one time from the chute to envelop the product to be packaged.

The rear end 5 of the chute 3 is preferably supported on an upstanding block 14 on table top 1 and said block is preferably provided wtih a horizontally extending forwardly directed slot 15 adapted to receive therein the rear end 5 of chute 3 (see FIG. 6). For centering the chute 3 in its proper position a pin 16 is fixed to block 14 within recess 15 so as to be received within a rearwardly opening recess 21 formed in the bottom of chute 3 at its rear end 5. Intermediate the ends of chute 3 the same is supported on a pair of transversely spaced blocks 17, 18 secured to table 1 and which blocks are connected by means of a transversely extending flat bar 19.

Fixedly secured to the underside of chute 3 is a transversely extending pipe 20 which, when the rear end 5 of chute 3 is positioned in slot 15 of block 14, is adapted to rest agaisnt the rear side of flat bar 19 thereby securely but releasably holding the chute 3 relative to the table top 1.

Although the above described structure is effective in most instances to releasably secure this chute 3 to the table top 1, it is preferable in some cases to provide apertures 23, 24 respectively in blocks 17, 18 in alignment with the axis of pipe 20 so that a locking pin 25 may be passed through said aperatures and through pipe 20 in order to retain the chute in a fixed position regardless of the amount of vibration and angularly directed impacts that it may receive.

By the above described supporting means for chute 3 it will be apparent that an operator may be applying a long length of packaging material 12 on one chute 3 while another identical chute 3 is being employed in the packaging operation. When the supply of the shirred material on the chute in use is exhausted it then becomes a simple matter to replace the empty chute with a filled chute with only a momentary pause in the packaging operation.

Although the present invention lends itself to manual feeding of the product 4 along the chute 3 the operation may be speeded up and improved in most cases by the provision of a feeding ram generally designated 30 and which includes an elongated cylinder 31 fixedly secured at one end on block 14 and at a point adjacent the rear end of table 1 on a block 32. Slidably received within cylinder 31 is a piston 33 (FIG. 3) to which is secured piston rod 34 which extends through the forward end of cylinder 31 in sliding engagement therewith. The forward end of rod 34 is provided with a pusher head 35 which is adapted to engage the product and push the latter along the length of chute 3. As best seen in FIG. 1, air under pressure is introduced into the rear end of cylinder 31 by means of flexible line 38 and, for the return stroke air under pressure is introduced into the forward end of the cylinder through flexible line 39.

Control of the cylinder 31 is effected by means of a valve 40 (FIG. 1) which is supported under table top 1 and along the side of the latter at which the operator of the device is positioned. Valve 40 is of the type which, when actuated, conducts air under pressure from compressed air line 41 through line 38 to advance the pusher head 35 along the length of chute 3. Upon release of valve 40 line 38 communicates with the atmosphere and the pressure from line 41 is connected to line 39 to retract the pusher head 35 to the normal position shown in FIG. 1.

In connection with the operation of the above described cylinder 31 it will be understood that a relatively rapid movement of the product 4 is effected so that the latter is forcibly pushed out of the forward end 6 of chute 3 so as to be enveloped in the tubular packaging material 12 held by the operator. Whether the feeding of the product 4 to chute 3 is from a conveyor belt or manually accomplished a flat bar 42 extending across the chute 3 at the rear end thereof prevents interference of the product with the pusher head 35 as well as providing stiffening for the chute at the rear end.

One of the important features of the present invention is the provision of a continuous label as an integral part of the package. An elongated label strip 50 is provided in the form of a roll 51 which is rotatably supported on an arbor 52 (FIG. 4) which is supported above the chute 3 by means of vertically extending flat bar 53 (FIG. 2) fixedly secured at its lower end to table top 1 as by welding.

Label 50 is passed longitudinally along the upper side of chute 3 and is guided by means of a pair of transversely spaced generally Z-shaped bars 54, 55 fixedly secured to the upper side of chute 3. Bars 54, 55 are spaced apart transversely and on opposite sides of the central longitudinal plane of the chute so that the operator may insert a finger in the space between the bars to urge the label 50 along the chute in a forward direction when a new roll 51 of labeling material is being set up. It will be apparent that the above described structure permits the removal of the packaging material 12 together with the label strip 50 so that the label 50 is interposed between the product and the packaging material 12 as indicated in FIGS. 1 and 2. The label is, of course, readily seen through the packaging material.

Forwardly of the discharge end 6 of the chute 3 a clipper generally designated 60 is positioned on table top 1. Clipper 60 is not described in detail herein since the particular type employed is not critical. Clipper 60 is of the type which deforms a pair of U-shaped staples about the material 12 at adjacent but spaced apart points along the length of the material 12. The clipper 60 is also provided with a knife 61 driven by an air cylinder 62 so that upon actuation of the clipper and delayed actuation of air cylinder 62 two clips 63, 64 are applied to the material with the material being cut at a point intermediate said clips (FIG. 2) and with clip 64 acting as the securing means for the rear end of the package generally designated 65 in FIG. 2 and clip 63 acting as the sealing means for the forward end of the successive package 65.

It will be understood that when the apparatus is started up the two clips 63, 64 may be applied to the end of the packaging material 12 with the forward clip 64 being discarded when the knife 61 is actuated to sever the material between clips 63, 64. Thereafter, as successive products are fed through the chute 3, the clipper 60 is actuated to simultaneously apply two clips with the knife 61 severing the material between said clips.

It will be seen that the above described apparatus permits a great saving in the material 12 in that each product may be tightly received within the packaging material with the latter being stretched by the operator to tightly surround the product and thereafter provided with clips to form a package.

For the actuation of the clipper 60 and knife 61 air under pressure is supplied to a valve 69 (FIG. 7) which in turn is actuated by an air actuated pilot valve 70 secured to the underside of table top 1 and supplied by air line 68. Pilot valve 70 is provided with an actuating pin 71 which is engageable by a plate 72 depending from the underside of table top 1 and which plate is pivotally secured at its upper end to table top 1 by pivot 73. The operator standing alongside table 1 may press the plate 72 with his right leg to actuate pilot valve 70. A similar leg actuated plate 74 may be provided for the ram control valve 40 so that the operator may engage the same with his left leg.

The operating valve 69 is provided with a poppet 75 (FIG. 7) which is actuated by air under pressure from line 76 connected to pilot valve 70.

Opening valve 69 includes a passage 77 connecting the cylinder 78 of clipper 60 with a source of air under pressure indicated schematically in FIG. 7 at 79. Another passage 80 in valve 69 connects the air cylinder 78 with the air cylinder 62 which controls the knife 61. The line 81 from passage 80 to knife cylinder 62 is preferably shunted to the atmosphere as indicated at 82 so that only some of the air from the relatively large clipper cylinder 78 is applied to the relatively small knife cylinder 62. At this point it will be noted that by employing the exhaust from clipper cylinder 78 to actuate the knife cylinder 62 a time delay is effected under all conditions so that the material 12 is not severed until both of the clips 63, 64 have been applied to the packaging material.

Poppet 75 in the valve 69 in its normal position closes passage 77 and opens passage 80. However, when poppet 75 is actuated upon actuation of pilot valve 70 passage 77 is opened and passage 80 is closed. Upon opening of passage 77 the clipper 60 is actuated and clips 63, 64 applied to the packaging material. Upon release of pilot valve 70, and the venting of line 76 to the atmosphere, the pressure in passage 77 closes poppet 75 thereby connecting cylinder 78 with passage 80 and permitting the piston in cylinder 78 to be returned to its normal position by a spring (not shown) and causing the exhaust air from cylinder 78 to be vented to the atmosphere through shunt 82 and at the same time actuate knife cylinder 62. As seen in FIG. 7, a small passage 84 is provided between passage 77 and the poppet 75 to permit return of the latter when line 76 is vented by pilot valve 70.

Since it is essential that the clipping operation by which the clips 63, 64 are applied to the packaging material be performed prior to the cutting operation, it will be seen that the above described valve arrangement provides an effective and inexpensive means for obtaining the necessary time delay.

The operation of the above described apparatus results in the provision of successive packages 65 which are generally uniform in appearance and each of which includes an elongated label strip 50 extending along the length of the package and fixedly secured thereto by the clips 63, 64. Preferably the label 50 should be one having a repetitive design so that it makes no difference where the label strip is cut.

Another form of the invention, shown in FIGS. 9 to 12, is particularly applicable when a relatively large product such as a turkey is to be wrapped and when it is not desired to employ power means for urging the product through the feed chute. In this case a chute generally designated 90 is provided on a table top or base 91. Chute 90 is generally tubular in shape and is spaced upwardly from the base 91 by means of a plate 92 fixedly secured to the underside of chute 90 and provided with a forward downwardly extending flange 93 engaging base 91. The rear end 94 of chute 90 is provided, along its lower side with a transversely extending pipe 95 through which a locking pin 96 is adapted to extend. Locking pin 96 is supported at its opposite ends in anchor plate 97, 98 (FIG. 9) which are secured to base 91.

To permit use of this apparatus on an existing table top or work area there is provided at the rear end of base 91 an integral ramp 100 which is secured to base 91 and to anchor plates 97, 98. This ramp 100 facilitates the sliding movement of the product 101 into the chute 90 which, of course, must be elevated from the base 91 to permit the storage thereon of the packaging material 102 in shirred condition in like manner as the packaging material 12 in the previously described embodiment. In this case the flange 93 is provided with a vertically disposed portion 104 which acts as a stop to limit the movement of the tubular packaging material 102 rearwardly of chute 90.

In this somewhat simplified form of the invention the product is fed by the operator into the rear end of the chute 90 and is pushed along the length of the latter and is discharged out the forward end 105 so that the operator may envelop the product 101 with the packaging material.

The clipper 106 in this form of the invention is also provided with two clipping elements which are fed with clips 107, 108 supported for movement along clip rails 109, 110 respectively. However, in this case the clips 107 are provided with shorter legs than the clips 108 for a reason which will now be explained.

As best seen in FIG. 10, clipper 106 includes a pair of die supports 111, 112. These die supports 111, 112 are formed with clip channels 113, 114 respectively along which the clips 107, 108 are translated by punches 115, 116 (see schematic FIG. 11).

Clippers of the type herein disclosed are provided with an entrance mouth through which the material to be clipped may be fed to the clipping position shown in FIG. 10. (See for example FIG. 2 of Patent No. 3,210,835.) This structure in effect forms a pair of upwardly extending posts of generally rectangular cross section and which are indicated at 117 and 118 in FIG. 10. By the present invention, instead of passing the packaging material in stretched condition into the clipping space such as is done in the previously described embodiment, the material is passed between the posts 117, 118 as indicated in dot-dash line 119 in FIG. 10 and then excess material from chute 90 is formed into a rope-like extension of the package and looped around post 118 as shown in FIG. 10. This results in a double thickness of material being engaged by clip 108 while a single thickness of material is engaged by clip 107 and at the same time a loop 121 is formed as an integral extension of the package 120 which countains the product 101.

From FIG. 10 it will be noted that when the knife 122 is actuated by air cylinder 123 in the same manner as previously described in connection with the first embodiment, a package such as that shown in FIG. 12 is produced.

The provision of the handle 121 is very important in case of heavy products such as turkeys since it gives a person an effective grip on such heavy products especially when it is necessary to remove them from freezer compartments at the point of purchase.

In the somewhat simplified form of apparatus shown in FIG. 8 the actuation of the clipper may be accomplished by the operator by pushing on a downwardly extending lever 124 provided with a cushioned pad 125 at its lower end. The knuckles of the operator's hand may be engaged against the pad 125 and the latter pushed to actuate the punches in the normal manner.

In order that the apparatus of FIGS. 8 to 12 be operable with optimum efficiency it is desirable to have the final clenching of both staples 107, 108 take place at substantially the same time. If this were not done unbalanced forces would be impressed on the piston (not shown) within cylinder 130 and to which piston the punches 115, 116 are secured at their inner ends. Since staple 108 is longer than staple 107, as best seen in FIG. 11, and since it is desirable to have the final deformation of both clips take place at the same time the punch 116 is made somewhat shorter than punch 115 and, although clip 108 engages its corresponding die before clip 107 engages its die, the loading at the initial stages of deforming the clips is not great and therefore the eccentric loading on the piston is not large enough to cause cocking. As best seen in FIG. 11, the difference in lengths of the punches is preferably less than the difference in length of the clips. By proportioning punches 115, 116, as shown in FIG. 11, the relatively high forces impressed on the punches at the end of the clip deforming step result in balanced reactions on the piston. If such reactions were not balanced the piston would tend to cock in cylinder 130 thus increasing friction and perhaps causing leakage.

In each of the above described embodiments the exact position of the clipper at the forward end of the feeding chute may be varied from that shown in order to provide maximum convenience and comfort to the operator. In many cases it has been found that by swinging the entire clipping mechanism so that it faces slightly forwardly of the direction of movement of the product the clipping step may be carried out most conveniently.

The above described method of forming loop 121 is particularly effective since the terminal portion of the loop which is secured by clip 108 is reversed in direction before the clip is applied. By this structure a greater resistance to loosening of the connection is achieved than would exist if the terminal portion were directed toward the body of the package 120. In the latter case the end of the loop would be more likely to slide out of the clip. In this same regard the differential in punch lengths noted above permits proportioning the punches 115, 116 (FIG. 11) and clips 107, 108 so that the gripping effect of said clips is equal. This results in the holding power of the seal at both ends of the package being equally strong.

The feeding chutes 3 and 90 described above also lend themselves to use with wrapping material which has previously been shirred onto a paperboard mandrel by the material supplier. In such a case the operator simply slides the loaded mandrel onto the feeding chute and then, holding the overwrapping material, slides the mandrel off the chute. In addition to saving time this procedure obviates the necessity of extra chutes.

The above specific descriptions of the preferred forms of the invention should not be taken as restrictive thereof since it will be apparent to those skilled in the art that various modifications may be resorted to without departing from the scope of the following claims.

We claim:
1. The method of forming one end of a package that includes a product and a covering of flexible packaging material comprising the steps of:
   providing an excess in the length of material at said one end,
   compressing said material and reducing its lateral extent at said one end to form an elongated rope-like extension of said package,
   forming a loop in said extension and clamping a double thickness of said extension to provide a closure for said package and an integral loop constituting a carrying means.
2. The method of packaging articles comprising the steps of:
   feeding said articles successively along a path of travel in one direction,
   feeding a length of flexible tubular packaging material along said path in encircling relation relative to said articles,
   compressing said material and reducing its lateral extent rearwardly of each article so encircled to form a rope-like extension,
   forming a closed loop in each such extension and clamping together the double thickness of material of said loop and simultaneously clamping the single thickness of material rearwardly of said double thickness,
   whereby said loop provides carrying means at one end of the article forwardly thereof and the clamping of the single thickness of material seals the opposite end of the successive package.

References Cited

UNITED STATES PATENTS 3,214,883   11/1965   Omori _____ 53—138 X

FOREIGN PATENTS 964,570   5/1957   Germany.

THERON E. CONDON, Primary Examiner

E. F. DESMOND, Assistant Examiner